US007900472B2

(12) United States Patent
Boudard et al.

(10) Patent No.: US 7,900,472 B2
(45) Date of Patent: Mar. 8, 2011

(54) HEAT EXCHANGE AND HEAT TRANSFER DEVICE, IN PARTICULAR FOR A MOTOR VEHICLE

(75) Inventors: Emmanuel Boudard, Voisins le Bretonneux (FR); Vitale Bruzzo, Padoue (IT)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 383 days.

(21) Appl. No.: 11/569,766

(22) PCT Filed: May 24, 2005

(86) PCT No.: PCT/FR2005/001284
§ 371 (c)(1),
(2), (4) Date: Feb. 23, 2007

(87) PCT Pub. No.: WO2006/000676
PCT Pub. Date: Jan. 5, 2006

(65) Prior Publication Data
US 2008/0295533 A1     Dec. 4, 2008

(30) Foreign Application Priority Data
Jun. 2, 2004    (FR) .................................... 04 05950

(51) Int. Cl.
*F25B 15/00* (2006.01)
*B01D 5/00* (2006.01)
(52) U.S. Cl. ......................................... 62/476; 165/116
(58) Field of Classification Search .................. 165/115, 165/140; 62/476, 479, 238.1
See application file for complete search history.

(56) References Cited

U.S. PATENT DOCUMENTS

| | | | | |
|---|---|---|---|---|
| 2,215,532 | A * | 9/1940 | Richardson | 165/97 |
| 5,282,507 | A * | 2/1994 | Tongu et al. | 165/165 |
| 5,368,786 | A * | 11/1994 | Dinauer et al. | 261/130 |
| 5,636,527 | A * | 6/1997 | Christensen et al. | 62/476 |
| 5,638,900 | A * | 6/1997 | Lowenstein et al. | 165/168 |
| 6,176,101 | B1 * | 1/2001 | Lowenstein | 62/484 |
| 6,247,331 | B1 * | 6/2001 | Nishiguchi et al. | 62/476 |
| 6,349,563 | B1 * | 2/2002 | Kinoshita | 62/476 |
| 6,523,357 | B1 * | 2/2003 | Katayama | 62/141 |
| 6,564,572 | B1 * | 5/2003 | Uchimura et al. | 62/476 |
| 6,745,826 | B2 * | 6/2004 | Lowenstein et al. | 165/115 |

FOREIGN PATENT DOCUMENTS

| | | |
|---|---|---|
| DE | 469735 | 12/1928 |
| DE | 476256 | 5/1929 |
| EP | 1 106 941 | 6/2001 |
| EP | 1 160 530 | 12/2001 |
| EP | 1 233 239 | 8/2002 |
| GB | 507416 | 6/1939 |
| JP | 4-268176 | 9/1992 |
| JP | 9-280692 | 10/1997 |
| JP | 10-206063 | 8/1998 |
| WO | 01/18463 | 3/2001 |

* cited by examiner

*Primary Examiner* — Cheryl J Tyler
*Assistant Examiner* — Filip Zec
(74) *Attorney, Agent, or Firm* — Nicolas E. Seckel

(57) ABSTRACT

A heat exchange and heat transfer device comprises an evaporating/absorbing arrangement connected to a binary mixture flow circuit containing a first refrigerant fluid and a second absorbing fluid. The refrigerant fluid is evaporated in the evaporator part of the arrangement and subsequently absorbed in the absorber part by an absorbing fluid-enriched mixture. The evaporating/absorbing arrangement comprises at least two oppositely disposed reference surfaces defining evaporation and absorption components, respectively, an evaporator mass for supplying the liquid refrigerant fluid to the reference surface of the evaporation component and an absorber mass for supplying the absorbing fluid-enriched mixture to the reference surface of the absorption component.

19 Claims, 1 Drawing Sheet

HEAT EXCHANGE AND HEAT TRANSFER DEVICE, IN PARTICULAR FOR A MOTOR VEHICLE

BACKGROUND

In the prior art, in particular according to WO 01/18463, a heat exchange and heat transfer device is already known that includes an evaporator/absorber assembly connected to a binary mixture flow circuit comprising a first so-called refrigerant fluid and a second so-called absorbing fluid, the liquid refrigerant fluid being evaporated in an evaporator portion of the assembly, then absorbed in an absorber portion of the assembly by the absorbing fluid-enriched mixture.

A heat exchange and heat transfer device of the aforesaid type makes it possible, in particular, to produce cold by using a heat source the temperature of which may be relatively low.

The binary mixture may contain water and lithium bromide, in which case the water forms the refrigerant fluid, or the mixture may contain ammonia and water, in which case the ammonia forms the refrigerant fluid.

In addition to the evaporator/absorber assembly, a heat exchange and heat transfer device of the aforesaid type usually includes a generator/condenser assembly.

The generator portion, also called the desorber portion, separates the refrigerant fluid from the absorbing fluid. As a matter of fact, the binary mixture is heated in the generator portion so as to cause vaporization of a portion of the refrigerant fluid, which is dissolved therein (desorption of the refrigerant fluid). Thus, refrigerant fluid vapor and a refrigerant fluid-depleted (absorbing fluid-enriched) liquid mixture is obtained at the output of the generator portion. This refrigerant fluid is condensed in the condenser portion.

In the evaporator/absorber assembly, the liquid refrigerant fluid coming from the condenser portion is vaporized in the evaporator portion, and then dissolved in the refrigerant fluid-depleted mixture (liquid) in the absorber portion.

In a conventional evaporator/absorber assembly, the means for conducting the vaporized refrigerant fluid from the evaporator portion to the absorber portion generally produces an increase in the pressure of the vaporized refrigerant fluid, limiting the performance levels of the heat exchange and heat transfer device.

In the evaporator portion, it is known to vaporize the liquid refrigerant fluid coming from the condenser portion by means of at least one first nozzle. In addition, in the absorber portion, it is known to vaporize the refrigerant fluid-depleted mixture by means of at least one second nozzle. The nozzles form droplets which increase the contact surfaces of the fluids and promote absorption of the refrigerant fluid-depleted (thus absorbent fluid-enriched) mixture.

Thus, an evaporator/absorber assembly conventionally includes nozzles intended to vaporize the liquid refrigerant fluid and the refrigerant fluid-depleted liquid mixture.

However, in a heat exchange and heat transfer device equipped with a nozzle-type evaporator/absorber assembly, the performance/volume ratio is very low.

Furthermore, if a heat exchange and heat transfer device equipped with a nozzle-type evaporator/absorber assembly is installed on a vehicle, the fluid jets issuing forth from these nozzles are susceptible to disruption by the acceleration or tilting of the vehicle, at least when this acceleration occurs in certain directions, at the risk of causing an untimely mixture of the refrigerant fluid and the refrigerant fluid-depleted mixture.

SUMMARY OF THE INVENTION

In particular, the object of the invention is to propose a heat exchange and heat transfer device of the aforesaid type, capable of being installed on a motor vehicle, and including a reliable evaporator/absorber assembly having a vaporized refrigerant fluid flow that is not very sensitive to increases in pressure, and operation that is not very sensitive to the acceleration and tilting of the vehicle.

For this purpose, the object of the invention is a heat exchange and heat transfer device of the aforesaid type, wherein the evaporator/absorber assembly includes:

at least two opposing reference surfaces delimiting two evaporator and absorber units, respectively, means for supplying the liquid refrigerant fluid to the reference surface of the evaporator unit, and means for supplying the absorbing fluid-enriched mixture to the reference surface of the absorber unit.

Owing to this arrangement, the transfer speed of the vaporized refrigerant fluid between the reference surfaces of the evaporator and absorber units is relatively slow, with the result being that the pressure of the vaporized refrigerant flow does not increase detrimentally during the course of this transfer. Furthermore, the flow of liquid refrigerant fluid as well as the flow of refrigerant fluid-depleted mixture are relatively insensitive to the acceleration and tilting of the vehicle.

Furthermore, the invention makes it possible to produce a nozzleless heat exchange and heat transfer device, thus having a relatively high performance/volume ratio.

According to other optional characteristics of this temperature control device:

the opposing reference surfaces are substantially planar and parallel to each other;

the device includes means for returning the absorbing fluid-enriched mixture to the reference surface of the absorber unit, these return means being inserted between the reference surfaces;

the return means include at least one return wall oriented so as to promote the gravity flow of the absorbing fluid-enriched mixture towards the reference surface of the absorber unit;

the evaporator/absorber assembly includes several units, e.g., numbering five, forming alternately arranged evaporator and absorber units;

at least one of the reference surfaces delimits a mass of material having a texture that promotes distribution of the liquid refrigerant fluid or absorbing fluid-enriched mixture over the reference surface delimited by this mass, in particular a porous material containing fibers or open-cell foam, for example;

the reference surface of the evaporator unit delimits a porous evaporator mass forming the means for supplying the liquid refrigerant fluid;

the reference surface of the absorber unit delimits a porous absorber mass forming the means for supplying the absorbing fluid-enriched mixture;

at least one of the reference surfaces delimits a mass made of metal or ceramic, in particular, having a thermal conductivity greater than or equal to 10 W/mK;

at least one of the reference surfaces has a geometric characteristic, in particular a corrugated or crenellated shape, that maximizes its surface area;

at least one of the reference surfaces, also known as the hydrophilic surface, has a geometric characteristic, in particular a hollow or protruding relief surface or pattern, that promotes distribution of the liquid refrigerant fluid or absorbing fluid-enriched mixture over this hydrophilic surface;

the evaporator/absorber assembly includes means for selectively recovering the liquid refrigerant fluid exiting the evaporator unit and the absorbing fluid-enriched mixture exiting the absorber unit;

the evaporator unit is thermally coupled with a heat transfer fluid circuit, also known as a control fluid, which is intended to extract calories, i.e., heat, from the evaporator unit;

the evaporator unit includes an evaporator mass wherein channels are arranged for the passage of the control fluid extracting calories;

the absorber unit is thermally coupled with a heat transfer fluid circuit, also known as a control fluid, which is intended to extract calories from the absorber unit;

the absorber unit includes an absorber mass wherein channels are arranged for the passage of the control fluid extracting calories;

the control fluid is a fluid circulating inside a motor vehicle.

BRIEF DESCRIPTION OF DRAWING FIGURES

The invention will be better understood upon reading the following description, given for illustrative purposes only, and with reference to the appended drawings in which.

DETAILED DESCRIPTION

Figure 1:
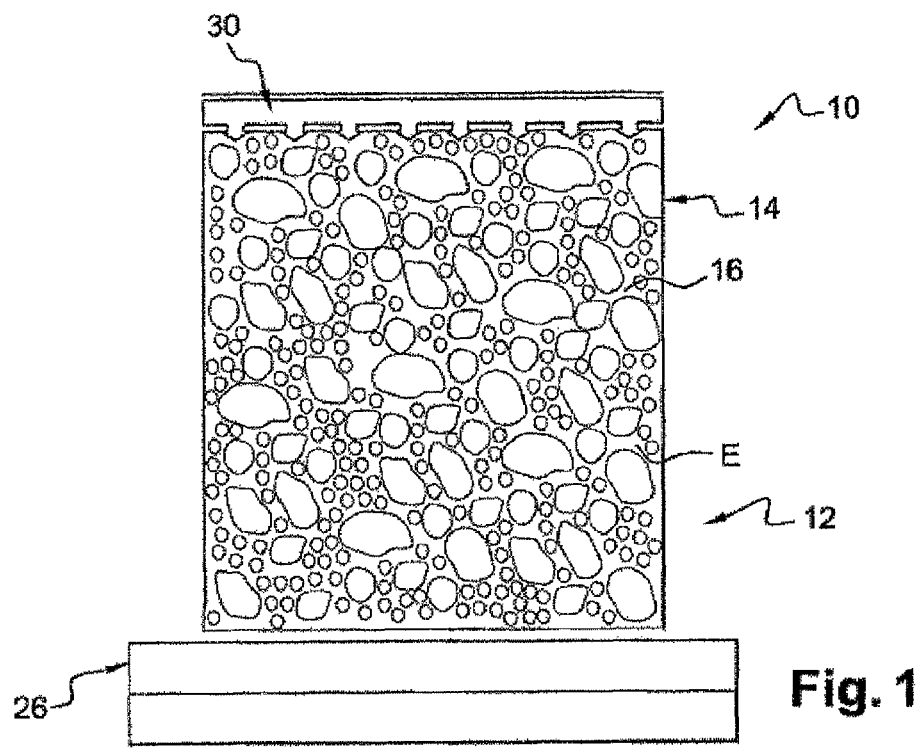
FIG. 1 is a schematic elevation of an evaporator/absorber assembly of a heat exchange and heat transfer device according to the invention.

In the figures, the heat exchange and heat transfer device of the invention is designated by the general reference 10. In the described example, temperature control device 10 is intended to be installed in a motor vehicle.

The temperature control device 10 includes a conventional known flow circuit for a binary mixture. This binary mixture comprises a first so-called refrigerant fluid and a second so-called absorbing fluid.

The temperature control device 10 includes a conventional generator/condenser assembly (not shown) and an evaporator/absorber assembly 12 shown in the figures. These two assemblies are connected in a known manner to the binary mixture flow circuit.

According to conventional operation, the refrigerant fluid exits in liquid form from the condenser portion of the generator/condenser assembly, and the refrigerant fluid-depleted (thus absorbing fluid-enriched) liquid supplies the absorber portion of the evaporator/absorber assembly 12.

The liquid refrigerant fluid exiting from the condenser portion is evaporated in the evaporator portion of the evaporator/absorber assembly 12. Next, the vaporized refrigerant fluid is absorbed by the absorbing fluid-enriched mixture in the absorber portion of the evaporator/absorber assembly 12.

Referring to the figures, it is seen that the evaporator portion of the assembly 12 includes at least one evaporator unit 14 equipped with an evaporator mass 16 and that the absorber portion of the assembly 12 includes at least one absorber unit 18 equipped with an absorber mass 20.

The evaporator/absorber assembly 12 includes two opposing surfaces E, A delimiting the evaporator and absorber masses 16, 20, respectively.

The evaporator mass 16 is also delimited by a surface E' that is opposite the preceding surface E.

In the same way, the absorber mass 20 is also delimited by a surface A' that is opposite the preceding surface A.

Preferably, the opposing surfaces E, A are substantially planar and parallel to each other, as are the surfaces E' and A'. The distance between the opposing surfaces E, E' or A, A' corresponds to the thickness of the masses 16, 20, i.e., the thickness of the units 14, 18 in the example described.

The average distance between the opposing surfaces E, A shall be determined by those skilled in the art such that the liquid refrigerant fluid coming from the condenser portion and the absorbing fluid-enriched mixture are prevented from mixing together as much as possible.

The surface areas of the opposing surfaces shall be determined by those skilled in the art such that the transfer rate of the vaporized refrigerant fluid between the opposing surfaces E, A is clearly lower than the compressibility rates of the gases (Mach 0.8).

Preferably, the evaporator mass 16 forms means for supplying the liquid refrigerant fluid (first liquid) to the surface E of the evaporator unit 14, and the absorber mass 20 forms means for supplying the absorbing fluid-enriched mixture (second liquid) to the surface A of the absorber unit 18.

For this purpose, each mass 16, 20 is made of a material having a texture that promotes distribution of the liquid-refrigerant fluid or absorbing fluid-enriched mixture over the surface E, A.

In the example described, the evaporator and absorber masses 16, 20 are porous and preferably contain fibers or open-cell foam.

In this way, each evaporator and absorber unit 14, 18 is delimited by two opposing porous surfaces corresponding to the surfaces E, E', A, A', so that these units are permeable to the refrigerant fluid in vapor form, particularly in the direction of their thickness.

The spreading and even distribution of the liquids over the opposing surfaces E, A can also be promoted by providing hollow or protruding relief surfaces or patterns on these surfaces E, A.

In this way, advantageous use is made of the porosity of the masses 16, 20 and the presence of relief surfaces or patterns, in order to optimize the hydrophilic property of the opposing surfaces E, A.

Each surface E, A may possibly have a geometric characteristic that maximizes its surface area. Thus, the surface areas of surfaces E, A can be maximized by selecting surfaces E, A that have overall corrugated or crenellated shapes.

The material of each mass 16, 20 preferably has a thermal conductivity greater than or equal to 10 W/mK. A material such as this may be made of metal or ceramic.

The evaporator unit 14 is preferably thermally coupled with a first heat transfer fluid circuit circulating inside the motor vehicle, also known as the external control fluid. This external control fluid is intended to extract calories from the evaporator unit 14, e.g., in order to cool a space or a device of the vehicle.

Figure 2:
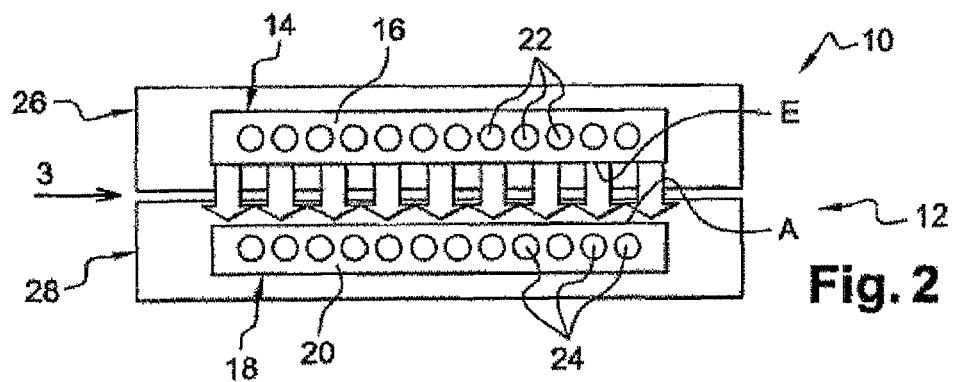
FIG. 2 is a schematic top view of the evaporator/absorber assembly shown in FIG. 1.

As can be seen in FIG. 2, channels 22 are arranged in the evaporator mass 16 for passage of the external control fluid.

The absorber unit 18 is also preferably thermally coupled with a second heat transfer fluid circuit circulating inside the motor vehicle, also known as the internal control fluid. This internal control fluid is intended to extract calories from the absorber unit 18, in particular in order to optimize the operation of the evaporator/absorber assembly 12.

As can be seen in FIG. 2, channels 24 are arranged in the absorber mass 20 for passage of the internal control fluid.

It shall be noted that the evaporator/absorber assembly 12 includes means 26, 28 that include, for example, reservoirs or channels for selectively recovering, by means of gravity in particular, liquid refrigerant fluid exiting from the evaporator unit 14, on the one hand, and, on the other hand, absorbing fluid-enriched mixture exiting from the absorber unit 18. The means 26, 28 thereby prevent untimely mixing of the liquid refrigerant fluid with the absorbing fluid-enriched mixture.

Where applicable, the evaporator/absorber assembly 12 may include several units 14, 18, e.g., numbering five, forming alternately arranged evaporator 14 and absorber 18 units.

Figure 3:
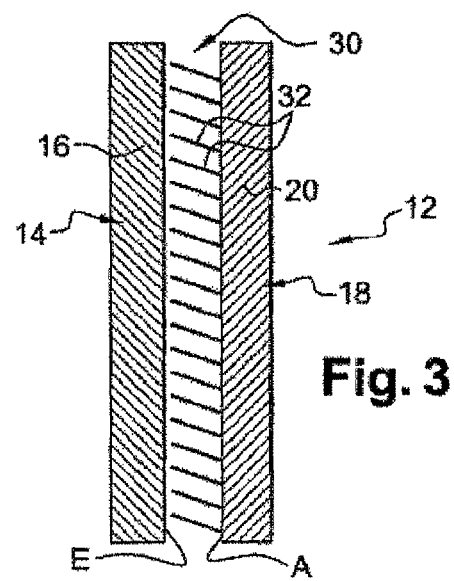
FIG. 3 is a view of the evaporator/absorber assembly along line 3 of FIG. 2.

As shown in FIG. 3, means 30 for returning the absorbing fluid-enriched mixture to the surface A of the absorber unit 18 are preferably inserted between the reference surfaces E, A.

In the example described, the return means 30 include return walls 32 oriented so as to promote the gravity flow of the absorbing fluid-enriched mixture towards the reference surface A of the absorber unit 18. These walls 32 are held by the absorber mass 20 or another support of the device 10.

In the example described, it shall be noted that the return walls 32 are substantially parallel to each other and inclined in a downwardly sloping direction from the evaporator surface E towards the absorber surface A.

Some of the operating features of the temperature control device 10 that are related to the invention will be described below.

In FIG. 1, a pipe 30 has been shown, which forms means for supplying the porous evaporator mass 16 with liquid refrigerant fluid coming from the condenser portion of the generator/condenser assembly. This pipe 30 is arranged in relation to the porous evaporator mass 16 so as to enable the liquid refrigerant fluid to flow through this porous mass 16.

The refrigerant fluid is brought by capillary attraction over the entire surface E of the evaporator unit 14.

Supply means similar to those for the liquid refrigerant fluid enable the absorbing fluid-enriched mixture to flow through this porous absorber mass 20.

In this way, the absorbing fluid-enriched mixture is brought by capillary attraction over the entire surface A of the absorber unit 18.

It shall be noted that the porosity of the masses 16, 20 makes it possible to draw advantage from relatively large active surfaces.

It shall be further noted that the two opposing porous surfaces E, E', A, A' of each evaporator 14 and/or absorber 18 unit promote circulation of the refrigerant fluid in vapor form. This circulation of refrigerant fluid in vapor form is in fact more efficient when the surfaces E', A' are porous rather than sealed by possible plates, which are intended, for example, to form supports for the porous masses.

As an alternative, other means for supplying the masses 16, 20 with liquids may be provided, in particular, means making it possible to wet the active surfaces of these masses 16, 20.

The liquid refrigerant fluid flowing over the surface E evaporates so as to create a flow of refrigerant fluid vapor between the opposing surfaces E, A of the evaporator 14 and absorber 18 units.

The evaporation of the refrigerant fluid produces calories in the evaporator portion, which can be withdrawn by the external control fluid in order to cool a space or device of the vehicle.

When the refrigerant fluid in vapor form reaches the surface A of the absorber unit 18, it is absorbed by the absorbing fluid-enriched mixture.

The absorption of the refrigerant fluid vapor by the absorbing fluid-enriched mixture produces calories in the absorber portion, which are capable of being extracted by the internal control fluid, in order to optimize operation of the evaporator/absorber assembly 12.

It shall be noted that, since the opposing surfaces E, A of the evaporator and absorber units are relatively large and close to each other, the transfer speeds of the refrigerant fluid between these surfaces are relatively low, steady, or even unidirectional, so that pressure drops are negligible during the course of this transfer.

Finally, it shall be noted that the use of several evaporator and absorber units arranged alternately in series makes it possible to produce a relatively compact evaporator/absorber assembly.

The invention claimed is:

1. A heat exchange and heat transfer device comprising:
   an evaporator/absorber assembly connected to a binary mixture flow circuit containing a refrigerant fluid and an absorbing fluid, the refrigerant fluid being evaporated from a liquid in an evaporator portion of the assembly, and absorbed in an absorber portion of the assembly by an absorbing fluid-enriched mixture, wherein the evaporator/absorber assembly includes:
   two masses forming an evaporator unit and an absorber unit, respectively,
   said evaporator unit being delimited by an evaporator reference surface and said absorber unit being delimited by an absorber reference surface,
   wherein the evaporator reference surface and the absorber reference surface face each other so that the evaporator unit is in fluid communication with the absorber unit through the evaporator reference surface and the absorber reference surface,
   means for supplying the refrigerant fluid in liquid form to the evaporator reference surface of the evaporator unit, and
   means for supplying the absorbing fluid-enriched mixture to the absorber reference surface of the absorber unit,
   wherein at least one unit selected from the evaporator unit and the absorber unit consists of a porous material permeable to the refrigerant fluid between the reference surface of the at least one unit and a surface of the at least one unit opposite this reference surface, so that the opposite surface and the reference surface of the at least one unit are porous unsealed surfaces in fluid communication with each other through the porous material,
   so that liquid refrigerant fluid is evaporated in the evaporator portion, transferred from the evaporator reference surface to the absorber reference surface, and absorbed by the absorbing fluid-enriched mixture in the absorber portion.

2. The exchange and heat transfer device according to claim 1, including means for returning the absorbing fluid-enriched mixture to the absorber reference surface of the absorber unit, the return means being inserted between the evaporator and absorber reference surfaces.

3. The heat exchange and heat transfer device according to claim 2, wherein the return means includes at least one return wall oriented to promote gravity flow of the absorbing fluid-enriched mixture towards the absorber reference surfaces of the absorber unit.

4. The heat exchange and heat transfer device according to claim 1, wherein the evaporator/absorber assembly includes a plurality of units, including alternately arranged evaporator units and absorber units.

5. The heat exchange and heat transfer device according to claim 1, wherein the porous material includes one of a foam and cellular fibers.

6. The heat exchange and heat transfer device according to claim 1, wherein the evaporator reference surface of the evaporator unit delimits a porous evaporator mass forming the means for supplying the refrigerant fluid in liquid form.

7. The heat exchange and heat transfer device according to claim 1, wherein the absorber reference surface of the absorber unit delimits a porous absorber mass of the means for supplying the absorbing fluid-enriched mixture.

8. The heat exchange and heat transfer device according to claim 1, wherein at least one of the evaporator and absorber reference surfaces delimits a mass made of a material having a thermal conductivity greater than or equal to 10 W/mK.

9. The heat exchange and heat transfer device according to claim 1, wherein at least one of the evaporator and absorber reference surfaces has a corrugated or crenellated shape for maximizing surface area.

10. The heat exchange and heat transfer device according to claim 1, wherein at least one of the evaporator and absorber reference surfaces is a hydrophilic surface that has a hollow or protruding relief surface or pattern for promoting distribution of the liquid refrigerant fluid or absorbing fluid-enriched mixture over the hydrophilic surface.

11. The heat exchange and heat transfer device according to claim 1, wherein the evaporator/absorber assembly includes means for selectively recovering the liquid refrigerant fluid exiting the evaporator unit and the absorbing fluid-enriched mixture exiting the absorber unit.

12. The heat exchange and heat transfer device according to claim 1, wherein the at least one unit is thermally coupled with a heat transfer fluid circuit for extracting calories from the unit.

13. The heat exchange and heat transfer device according to claim 12, wherein the heat transfer fluid circuit includes channels for passage of the control fluid and extracting calories, said channels being formed in the mass of the at least one unit between said porous unsealed surfaces.

14. The heat exchange and heat transfer device according to claim 1, wherein the at least one unit is the absorber unit.

15. The heat exchange and heat transfer device according to claim 1, wherein the at least one unit is the evaporator unit.

16. The heat exchange and heat transfer device according to claim 12, wherein the heat transfer fluid is a fluid circulating inside a motor vehicle.

17. The heat exchange and heat transfer device according to claim 1, wherein each of the evaporator unit and the absorber unit is thermally coupled with a respective heat transfer fluid circuit for extracting calories from the unit, wherein each of the respective heat transfer fluid circuits includes channels for passage of the control fluid and extracting calories, said channels being formed in the mass of the respective units between said porous unsealed surfaces.

18. The heat exchange and heat transfer device according to claim 1, wherein the evaporator and absorber reference surfaces are substantially planar and parallel to each other.

19. The heat exchange and heat transfer device according to claim 1, comprising three masses forming at least one of:
(i) a central evaporator unit and two lateral absorber units sandwiching the evaporator unit, respectively, said central evaporator unit being delimited by two porous unsealed evaporator reference surfaces each facing a respective absorber reference surface of each of said lateral absorber units, wherein the central evaporator unit is in fluid communication with each of the lateral absorber units through the respective porous unsealed evaporator reference surfaces, and
(ii) a central absorber unit and two lateral evaporator units sandwiching the absorber unit, respectively, said central absorber unit being delimited by two porous unsealed absorber reference surfaces each facing a respective evaporator reference surface of each of said lateral evaporator units, wherein the central absorber unit is in fluid communication with each of the lateral evaporator units through the respective porous unsealed evaporator reference surfaces.

* * * * *